US006966037B2

(12) United States Patent
Fredriksson et al.

(10) Patent No.: US 6,966,037 B2
(45) Date of Patent: Nov. 15, 2005

(54) METHOD AND APPARATUS FOR SCROLLABLE CROSS-POINT NAVIGATION IN A CALENDAR USER INTERFACE

(75) Inventors: Linus Fredriksson, Linköping (SE); Urban Nyberg, Linköping (SE)

(73) Assignee: Nokia Corporation, Espoo (FI)

( * ) Notice: Subject to any disclaimer, the term of this patent is extended or adjusted under 35 U.S.C. 154(b) by 526 days.

(21) Appl. No.: 09/988,918

(22) Filed: Nov. 19, 2001

(65) Prior Publication Data

US 2003/0095149 A1 May 22, 2003

(51) Int. Cl.$^7$ ................................................ G06F 3/00
(52) U.S. Cl. ...................... 715/830; 715/767; 715/794; 715/783; 715/790; 715/802; 715/810; 715/825
(58) Field of Search ............................... 345/767, 794, 345/783, 790, 802, 810; 715/825, 830, 828, 829, 779, 784

(56) References Cited

U.S. PATENT DOCUMENTS

| | | | |
|---|---|---|---|
| 4,241,521 A | | 12/1980 | Dufresne |
| 4,313,113 A | * | 1/1982 | Thornburg .................. 345/159 |
| 5,059,965 A | | 10/1991 | Geiser |
| 5,283,560 A | | 2/1994 | Bartlett |
| 5,485,175 A | | 1/1996 | Suzuki ........................ 395/156 |
| 5,677,708 A | | 10/1997 | Matthews, III et al. |
| 5,751,369 A | | 5/1998 | Harrison et al. ............. 348/552 |
| 5,815,155 A | | 9/1998 | Wolfston ..................... 345/357 |
| 6,236,396 B1 | * | 5/2001 | Jenson et al. ................ 345/764 |
| 6,323,883 B1 | * | 11/2001 | Minoura et al. ............. 345/784 |
| 6,538,672 B1 | * | 3/2003 | Dobbelaar ................... 345/810 |
| 6,702,284 B2 | * | 3/2004 | Sette et al. .................. 271/291 |
| 6,910,191 B2 | * | 6/2005 | Segerberg et al. .......... 715/830 |
| 2003/0001898 A1 | * | 1/2003 | Bernhardson ................ 345/786 |
| 2003/0001907 A1 | * | 1/2003 | Bergsten et al. ............. 345/853 |
| 2003/0169302 A1 | * | 9/2003 | Davidsson et al. .......... 345/810 |
| 2004/0008229 A1 | * | 1/2004 | Hultcrantz ................... 345/810 |
| 2004/0233238 A1 | * | 11/2004 | Lahdesmaki ................ 345/810 |

FOREIGN PATENT DOCUMENTS

| | | | |
|---|---|---|---|
| WO | WO 00/65429 | 11/2000 | ............ G06F/3/033 |
| WO | WO 00/79374 A1 | 12/2000 | ............ G06F/3/033 |

OTHER PUBLICATIONS

Mechanism of displaying a menu which minimizes the eye movement IBM Technical Disclosure Bulletin, IBM Corp. New York, US, vol. 36, No. 8, Aug. 1, 1993 pp. 25–28, XP00090130.

* cited by examiner

*Primary Examiner*—Kristine Kincaid
*Assistant Examiner*—Ryan Pitaro
(74) *Attorney, Agent, or Firm*—Cohen, Pontani, Lieberman & Pavane

(57) ABSTRACT

Method and apparatus for displaying an electronic calendar in a scrollable cross-point navigation image having two bars, each containing panels corresponding to a separate folder or entry of the calendar's hierarchy of folders and entries. At the intersection of the bars is displayed the current lowest level and the next upper level, if any. In one embodiment, the next higher level is shown in an adjoining panel on a first bar, the next higher level in a next adjoining panel on that bar, until there are no further higher levels to display, at which point the remaining upper-most level folders are displayed. The second bar displays sub-folders or calendar entries within the folder in the focus panel. Moving in the folder hierarchy causes the panels in the first bar to shift to display all intervening levels through the top level.

78 Claims, 13 Drawing Sheets

METHOD AND APPARATUS FOR SCROLLABLE CROSS-POINT NAVIGATION IN A CALENDAR USER INTERFACE

FIELD OF THE INVENTION

The present invention relates to a method and apparatus for displaying a calendar on a display of an electronic device.

BACKGROUND OF THE INVENTION

Electronic calendars are in widespread use today with a variety of electronic devices to remind users of various upcoming events. Such electronic calendars allow a user to add, delete and edit entries which are stored in the electronic calendar document so that when the calendar is displayed on a display, the events appear in boxes that appear in the calendar for the appropriate day and time of the event. Thus, each day of such electronic calendars is typically divided into a plurality of time blocks, with each time block representing, for example, a fifteen minute, thirty minute, or one hour time period. Typically, the user is reminded by a signal, visual, audio or both, shortly before the event stored in the calendar is scheduled to occur. Such electronic calendars are in widespread use in various electronic devices, such as, for example, personal computers (PCs), portable laptop computers, personal digital assistants (PDAs), video cassette recorders (VCRs), and television set-top boxes or multimedia terminals, such as the Nokia Mediaterminal. The types of reminders that may be stored in such electronic calendars are limitless and include, for example, appointments, things to do, phone calls to make, television broadcast programs to watch or record, bills to be paid, etc.

One such electronic calendar that is in widespread use is the one that is part of the Windows Outlook computer program distributed by Microsoft. The Outlook program has a variety of versions of varying complexity that are used with a variety of electronic devices, primarily, computers and PDAs. In one version of the Outlook calendar program for use on a PC, the calendar entries can be shown in four settings. In the "Month" setting, each day is shown as a separate box and entries for each day are displayed within the box for that day, with each entry indicating the pertinent time. In the 7-day "Week" setting, seven boxes are shown and entries for each day are displayed within the box for that day, with each entry indicating the pertinent time. In the "Work Week" setting, five columns are shown, with the columns divided into half hour time blocks where entries are shown. In the "Day" setting, a single column for a single day is shown with the column divided into half hour time blocks for the display of calendar entries. For the "Day", "Work Week" and "Week" settings a display of at least one month is displayed in a window of the display. Navigation through the Outlook calendar in the various calendar display settings may be accomplished with a point and click mouse (or similar device, such as a stylus or mouse touchpad) or by using arrow keys. For example, pointing and clicking on a particular time slot or box within a displayed day will bring the cursor to that time slot allowing the entry, viewing, editing or deleting of a calendar entry. Similarly, the arrow keys move the cursor through the calendar, with the particular movement for a particular arrow key being dependent on the particular calendar setting being used.

A disadvantage of the Outlook calendar is that it is designed to cover the entire area of the display (or at least a significant portion thereof if the calendar's display size is minimized to some extent), thereby obscuring a significant contiguous block of content shown on the display. Such obscuring of an entire block of the display prevents a user from observing what may be displayed beneath the calendar. Although this deficiency may not be so significant if the background display is static, such as if the background is displaying a word processing document, it is a clear disadvantage if the background display is dynamic, such as if the background is displaying a television or video program.

One electronic device user interface that is simple for a user to operate and also does not obscure a great proportion of the display is disclosed in PCT Patent Publication No. WO 00/65429. In accordance with that user interface, a display on or associated with the electronic device presents to the user a pair of intersecting cross-point navigation bars. At least one of these bars is scrollable, and each bar displays one or more object fields. By selectively scrolling one or both of the bars, one at a time, by pressing appropriate buttons on the electronic device or its remote controller, the user positions a particular object field, or selection, at the point where the two bars intersect. When the user depresses a "select" button, the displayed object field is selected, and either a bar of the display transforms to the selected sub-field, or the electronic device performs the action corresponding to the displayed object field selected, thereby adjusting or setting the electronic device in the desired manner. By pressing another button when a particular object field is at the intersection of the two bars, the level of the object field displayed in the entire corresponding bar is changed so that the user is given a group of choices that fall under the selected object field category. Thus, for example, if the vertical bar has six object fields (A, B, C, D, E, and F), the horizontal bar will show sub-fields corresponding to the object field positioned at the intersection of the two bars (F-1, F0, F1, F2, F3, etc.), as shown in FIG. 2a of the patent publication. If the user depresses a predefined navigation key, sub-sub-fields (F2:-1, F2:0, F2:1, F2:2, F2:3, etc.) corresponding to the sub-field (F2) positioned at the intersection of the two bars are then displayed on the vertical bar, as shown in FIG. 2b of the patent publication. In actual use, words descriptive of, for example, instruction categories or actual instructions to be transmitted to the electronic device are displayed to the user, not merely letters and numbers. Such listing and selection of sub- and sub-sub-fields can go down to as many levels as is necessary to provide the user with a desired selection of options. To navigate upward through the levels, a second predefined navigation key is depressed by the user, and, as a result, the visual content of the appropriate bar is changed to reflect a change in field level.

Although the user interface disclosed in PCT Patent Publication No. WO 00/65429 is fully able to permit a user to satisfactorily navigate among a plurality of possible instructions or device settings arranged in a plurality of groups, sub-groups, sub-sub-groups, etc., it may be somewhat difficult for a user to determine where in the menu hierarchy of possible instructions and groups of instructions he currently is so that he can easily navigate to another desired available electronic device instruction or setting, or group of such instructions or settings. This difficulty arises because only two levels of groups (or fields) are simultaneously displayed to the user. Whenever a group, sub-group, etc. is selected, the appropriate bar is overwritten by the sub-entries in the selected group or sub-group. Thus, no map is displayed showing generally where in the hierarchy of groups, sub-groups, etc. the user currently is located. As a result, a user unfamiliar with the hierarchy of the groups may be forced to randomly press the navigation buttons repeatedly, thereby navigating up, down and/or through the levels, until he has found the desired instruction or group of instructions, or a group of instructions or an instruction that is familiar to the user to enable him to navigate to the instruction or group of instructions actually desired.

SUMMARY OF THE INVENTION

The present invention provides a method and apparatus for presenting a calendar on a display of or associated with an electronic device while not obscuring a great amount of the background of the display. In two embodiments, the invention allows the user to navigate through a hierarchy of calendar groups while continuously providing the user with information as to where the user is currently located in the hierarchical structure of calendar groups so that navigation through the groups and individual calendar entries is simplified.

The present invention can be used on or with any electronic device or appliance which may require calendar reminders or settings, such as, for example, PCs, portable laptop computers, PDAs, VCRs, television set-top boxes, multimedia terminals, television sets, satellite receivers, cable television controllers, household equipment, telephones, mobile phones, DVD players, CD players, stereo equipment, etc., especially appliances provided with user interfaces such as display screens for interaction with remote control and other key pad devices.

In accordance with the present invention, a scrollable cross-point navigation image of a calendar is displayed on a user interface display to select a feature of a calendar by combining two object fields. Two bars are displayed, each bar containing a plurality of panels, with each panel displaying a separate folder. The two bars are positioned so that the bars overlap in a single focus panel. Preferably, the two bars are sized, shaped and positioned so as not to completely obscure the entirety of the display. As a result, a user can view the two bars, and can also view any programming or other information that is also being presented on the display.

The calendar selections that are available for selection by the user are arranged in an associated database in a plurality of levels of groups (sub-groups, sub-sub-groups, etc.) so that entries, etc. of a similar level are in the same group, with the top most level being the most general, and the lowest most level being particular calendar entries. In between the top and bottom levels, there may be sub-levels which organize the contents of the database. The items in each level are linked to one or more items in immediately higher or lower levels, if any, to form a tree-like hierarchical structure.

When a user initially activates the calendar feature of the electronic device by entering the appropriate command on an input device, the calendar user interface appears on a display on or associated with the electronic device being controlled. The focus panel displays (1) the user's current lowest level in the hierarchical structure of calendar groups and (2) the next higher level, if any. In a first embodiment of the invention, the next higher level, if any, is shown in an adjoining panel on the horizontal bar, the next higher level, if any, is shown in a next adjoining panel on the horizontal bar, and so on until there are no further higher levels to display, at which point the remaining upper-most level calendar folders are displayed in the panels on the horizontal bar. In the panels of the vertical bar are sub-folders, if any, or individual calendar entries, if any, that are within the folder appearing in the focus panel, that is, such sub-folders or entries that are of the same level as the user's current lowest level in the hierarchical calendar structure appearing in the focus panel. As the user descends down the folder hierarchy, the panels in the horizontal bar shift to the right and panels identifying levels between the current level and the top most level are displayed. As the user ascends through the calendar folder hierarchy, the panels in the horizontal bar shift to the left. To navigate up or down folder levels and to select a particular folder at any level, the user employs the input device to cause the bars, one at a time, to scroll up, down, left and right to cause a particular panel to be shifted into the focus panel and thereby navigate through the various levels of the hierarchical structure of groups of calendar selections. When the focus panel is positioned at a desired folder, the user selects it with the input device. If a particular ultimate calendar entry or time block within a folder, sub-folder, etc., is selected by the user, the calendar entry or time block is entered for insertion of a reminder, or an existing previously entered reminder is opened for editing or for deletion. To move upward in the hierarchy to one of the folders shown in the horizontal bar to the right of the focus panel, the user simply uses the input device to scroll the horizontal bar as desired.

The user interface, thus, always displays the user's current location in the hierarchical calendar structure and the path of the folder, sub-folder, and sub-sub-folder, etc., that the user descended through to get to the current calendar location. Because this folder path information is continuously displayed to the user, navigation through the calendar folder structure and the calendar entries within that structure is immediately apparent and simple.

In another embodiment of the invention, when a folder is selected from the focus panel, the horizontal bar is changed to display sub-folders within the selected folder and the vertical bar displays sub-sub-folders or entries within the sub-folder in the focus panel. One or more boxes on the display indicate the level within the hierarchy that is currently displayed along with other possible levels. Selecting one of these boxes using a pointer controlled by an input device causes the display to show the selected levels. Alternatively, dedicated "up" and "down" level buttons on the input device can be activated to navigate between displayed levels.

In another embodiment, when a folder is selected from the focus panel, the horizontal bar is similarly changed to display sub-folders within the selected folder and the vertical bar displays sub-sub-folders or entries within the sub-folder in the focus panel. One or more boxes on the display show the folders that have been selected to result in that particular sub-folders and sub-sub-folders displayed in the horizontal and vertical bars.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

Figure 1:
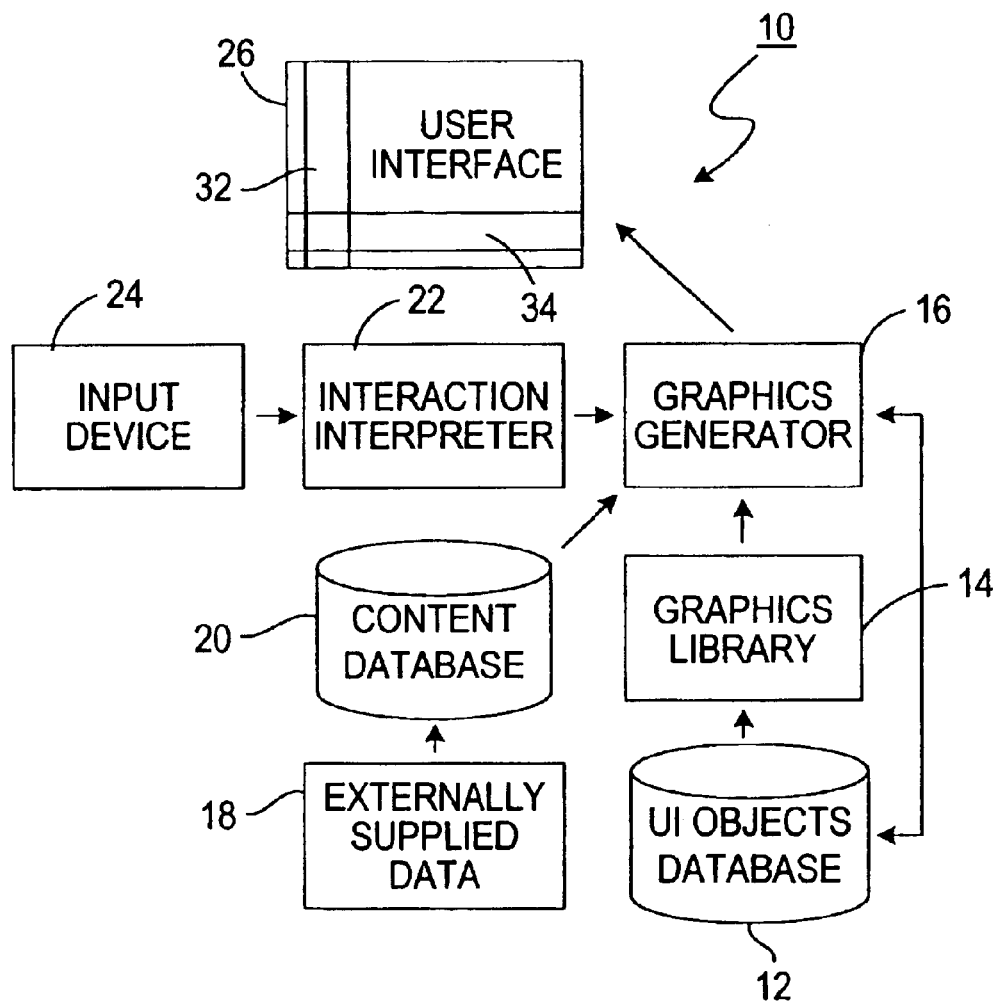
FIG. 1 is a schematic block diagram illustrating one embodiment of means used to accomplish a apparatus in accordance with the present invention.

FIG. 1 is a schematic block diagram of one embodiment of an apparatus 10 in accordance with the present invention, comprising a UI objects database 12, a graphics library 14, a graphics generator 16, an externally supplied data means 18, a content database 20, an interaction interpreter 22, an input device 24, and a user interface 26.

The input device 24 is any means that can be employed by a user to enter commands to control the user interface 26 and can be any of a number of manual controllers, such as, for example, a hand-held remote control with a keypad for a television set-top box, a keyboard for a PC, a point and click computer mouse (or similar device, such as a stylus or mouse touchpad), a remote controlled computer mouse, or a control panel with a keypad for a microwave oven. When a user wants to change a calendar setting of the interface 26, the input device 24 is manipulated, such as by the depressing of keypad buttons, to transmit a signal to the interaction interpreter 22. Preferably, as will become more apparent from the discussion below, the input device has directional keys (up, down, right, and left) and a "select" key which a user can depress to provide a selection command. The input device 24 may instead and/or also comprise means for detecting and interpreting spoken commands of the user. A spoken command device would for example, include a microphone, a data processor, a database containing vocabulary data, and speech recognition software to recognize voice commands of a user to the electronic device.

An interaction interpreter 22 interprets signals received from the input device 24 and sends the corresponding instruction to a graphics generator 16. The interaction interpreter 22 transforms commands from the input device 24 to actions provided by the graphics generator 16.

The content database 20 contains calendar entries, and groups or folders of calendar entries which can be presented on the user interface 26, which is preferably a screen, such as a television screen, monitor or flat panel display, such as liquid crystal or a plasma display. Samples of such information could be, for example, names of calendar fields containing sub-fields or finite calendar entries that are presented to a user upon entry by the user of the appropriate commands. A calendar field is the name of a class or group of calendar entries, sub-fields of settings, or sub-sub-fields of settings, etc. An example of a calendar field is the group, "October". A finite object is a calendar entry of the calendar. An example of a finite object is the particular entry, "08:30–09:00 Meeting". At least certain of the material in the content database 20 can be altered and/or edited by the user of the electronic device through the user interface 26. Externally supplied data 18 represents any content that is in the content database 20 from any source.

The UI objects database 12 contains types of graphical objects that can be presented on the user interface 26. The UI objects database 12 supplies a graphics library 14 with generic representations of the types of graphical objects. The graphics library 14 contains functions to manipulate the UI objects in the interface 26. The graphics library 14 supplies the graphics generator 16 with specific instances from the UI objects database 12.

The graphic generator 16 controls the graphical presentation of the user interface 26 as well as manipulation accomplished by a user. The graphics generator 16 performs actions signaled by the interaction interpreter 22 through collecting content from the content database 20 and by merging the content with the graphics library 14 and delivering presentation of a desired action to the user interface 26. The user interface 26 presents feedback of any action performed by a user of the interface 26.

Figure 2:
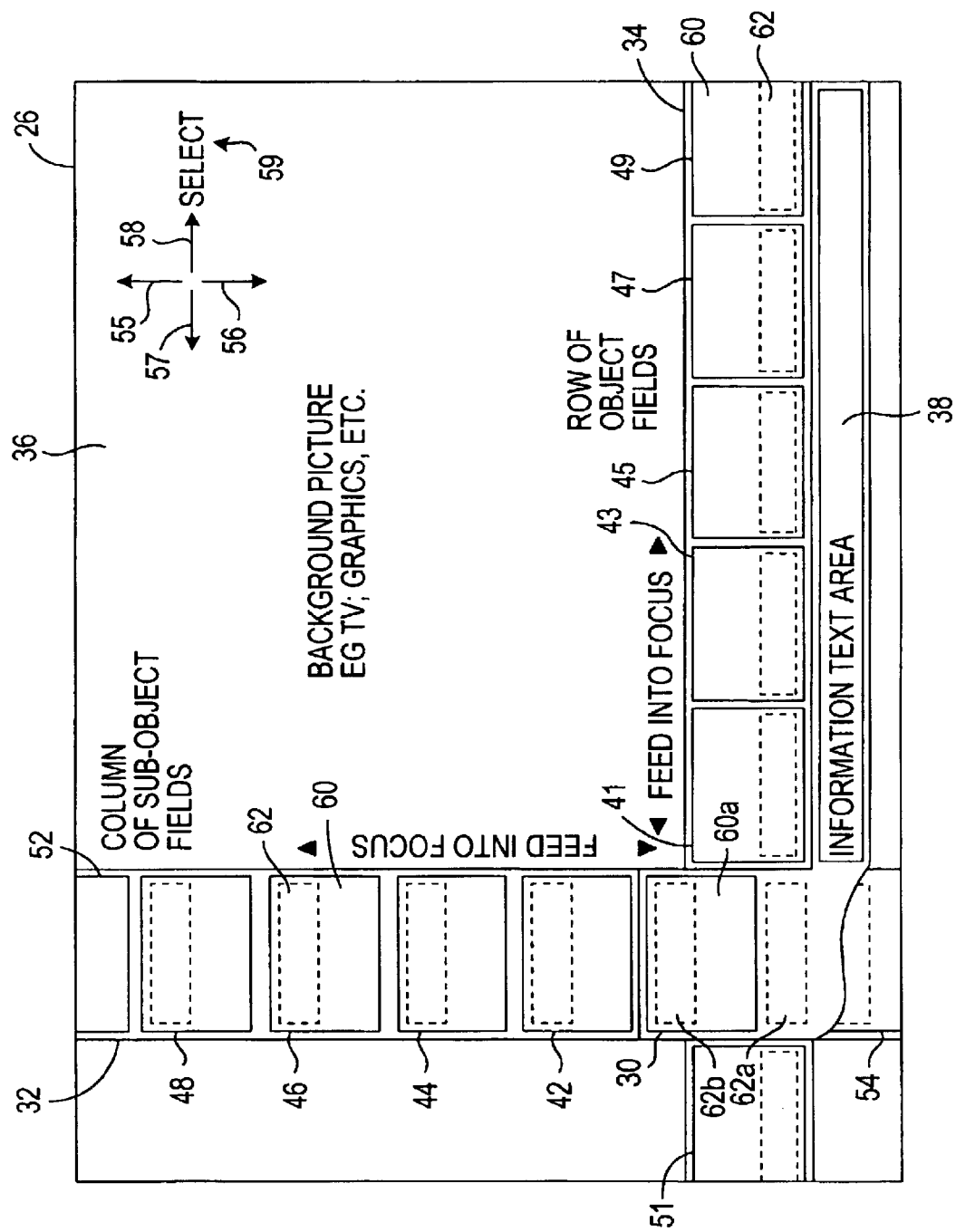
FIG. 2 is a schematically diagram of a preferred embodiment of a user interface in accordance with the present invention.

FIG. 2 schematically illustrates a user interface 26 in accordance with one embodiment of the present invention. The user interface 26 has two intersecting bars, preferably, a vertical bar 32 and a horizontal bar 34. The bars 32, 34 are preferably perpendicular to one another and are positioned proximate edges of the display area of the user interface 26 so that obstruction by the bars is minimized of any background picture 36, such as a television program, graphics, etc. Although the bars 32, 34 are shown as being positioned proximate the left and bottom edges of the user interface, alternatively, they may be at any other location, such as free floating at any location in the background picture 36, or may be positioned along adjacent edges of the user interface. In addition, although bars 32, 34 are shown as being linear in shape, they may assume any shape, such as, for example, curved into two circular or oval lines. Each of the bars 32, 34 is comprised of a plurality of panels, with vertical bar comprising panels 54, 30, 42, 44, 46, 48 and 52, and with horizontal bar comprising panels 51, 30, 41, 43, 45, 47 and 49. Each bar 32, 34 may comprise more or fewer panels, as desired. The two bars, 32, 34 intersect with a common panel, focus panel 30. Although the panels are show as being substantially rectangular in shape, they may assume any shape, such as square, oval, round, hexagonal, etc. Each of the panels preferably has one or more areas on which appears textual information and/or graphics. For example, each panel of the vertical bar 32 has a smaller upper area 62 and a larger central area 60. Similarly, each panel of the horizontal bar 34 has a smaller lower area 62 and a larger central area 60. The focus panel 30, which is the panel where the vertical bar 32 and the horizontal bar 34 intersect, preferably has a larger central area 60a, a smaller lower area 62a, and a smaller upper area 62b. The areas 60, 60a, 62, 62a, and 62b of the panels are used to display the textual information and/or graphics, as discussed below. The user interface 26 preferably also has an information field 38 positioned below the horizontal bar 34 where additional information can optionally be displayed. Finally, the user interface 26 preferably displays a plurality of possible navigation commands, shown as up, down, left and right arrows 55, 56, 57, 58 and a "Select" command 59. Although the navigation commands are shown as directed arrows 55, 56, 57, 58, they may also be depicted as words or other pictures, such as pointing fists. The navigation and "Select" commands may be continuously displayed and highlighted when the user selects a particular command with the input device 24, or, alternatively, only displayed when a user actually selects that command. Although the command graphics 55, 56, 57, 58, 59 are show in the upper right of the user interface 26, they may be in any position. Preferably, the command graphics 55, 56, 57, 58, 59 are omitted entirely from the display at all times. However, if the user interface is a mouse, the display command graphics, such as those shown, enable selection by the user of a command by clicking with the mouse's pointer on the appropriate command graphic 55, 56, 57, 58, 59. Additional, if the display is a touch screen, command graphics may be displayed so that touching by the user of the appropriate graphic selects that command for execution.

The various portions of the bars 32, 34, any text or graphics on the bars 32, 34, and the commands 55, 56, 57, 58, 59, and are preferably suitably colored or shaded to contrast appropriately against the background picture 36 and other elements of the displayed information on the user interface 26 so that the user can easily discern all of the displayed information.

In operation, a user initially activates the user interface feature of the electronic device by entering the appropriate command on the input device 24. Thereupon, the user interface 26 appears on the appropriate display on or associated with the electronic device. For certain electronic devices where information of interest is continuously shown, such as entertainment programming on a television monitor, for example, it is desirable that the user interface 26 only appear when the user wants to change a setting of the television. For other electronic devices where the associated display does not provide any other information, the user calendar interface 26 might be continuously displayed.

All possible calendar selections available are arranged in the content database 20 in one or more levels of groups (sub-groups, sub-sub-groups, etc.) so that calendar selections of a similar nature are in the same group. The items of a first level are very general. In a second level, the items are more detailed than in the first level, but are still somewhat general. In a third level, the items are even more detailed than in the second level. And so on. The items are linked according to their contents. This means that an item of the first level is linked to one or more items of the second level. Additionally, an item of the second level is linked to one or more items of the third level. And so on. Thus, with this linking structure, the items are arranged in a tree-like manner or hierarchical structure with any branch of the tree constituting a further level. The system may be such that the user may alter and/or edit the calendar groups shown at the various levels. Thus, a folder in one particular level, for example, may have more or fewer sub-groups, sub-sub-groups, etc. than other folders in that same level.

As discussed in detail below with reference to FIGS. 3 to 8 in which a particular embodiment is shown, the user's current location within the folder hierarchy is continuously displayed to the user in the horizontal bar 34. The focus panel 30 displays (1) the user's currently selected lowest level in the hierarchy in area 62a and (2) the next higher level, if any, in the area 62b. As the user descends into the folder hierarchy, the next higher level, if any, is shown in panel 41, the level above the level shown in panel 41 is shown in panel 43, and so on to the right across horizontal bar 34 until there are no further higher levels to display, at which point the remaining upper-most level folders are displayed in the panels on the horizontal bar 34. As the user descends down the folder hierarchy, the panels in the horizontal bar 34 shift to the right and panels identifying levels between the current level and the top most level are displayed. As the user ascends through the folder hierarchy, the panels in the horizontal bar 34 shift to the left. To navigate up or down folder levels and to select a particular folder at any level, the user employs the input device 24 to activate "up", "down", "left", "right" and "SELECT" commands which cause the bars 32, 34 to scroll in the selected direction, as indicated in FIG. 2) to cause a particular panel to be shifted into the focus panel 30. In the panels of the vertical bar 32 are sub-folders, if any, or individual settings, if any, that are within the folder appearing in area 62a of focus panel 30, that is, such sub-folders or settings that are of the same level as the user's current lowest level in the hierarchical calendar structure appearing in area 62b of the focus panel 30.

To more fully understand the present invention, one embodiment of the present invention is shown in operation in FIGS. 3 to 8, in which the numbering of the various elements has been simplified relative to FIG. 2.

Figure 3:
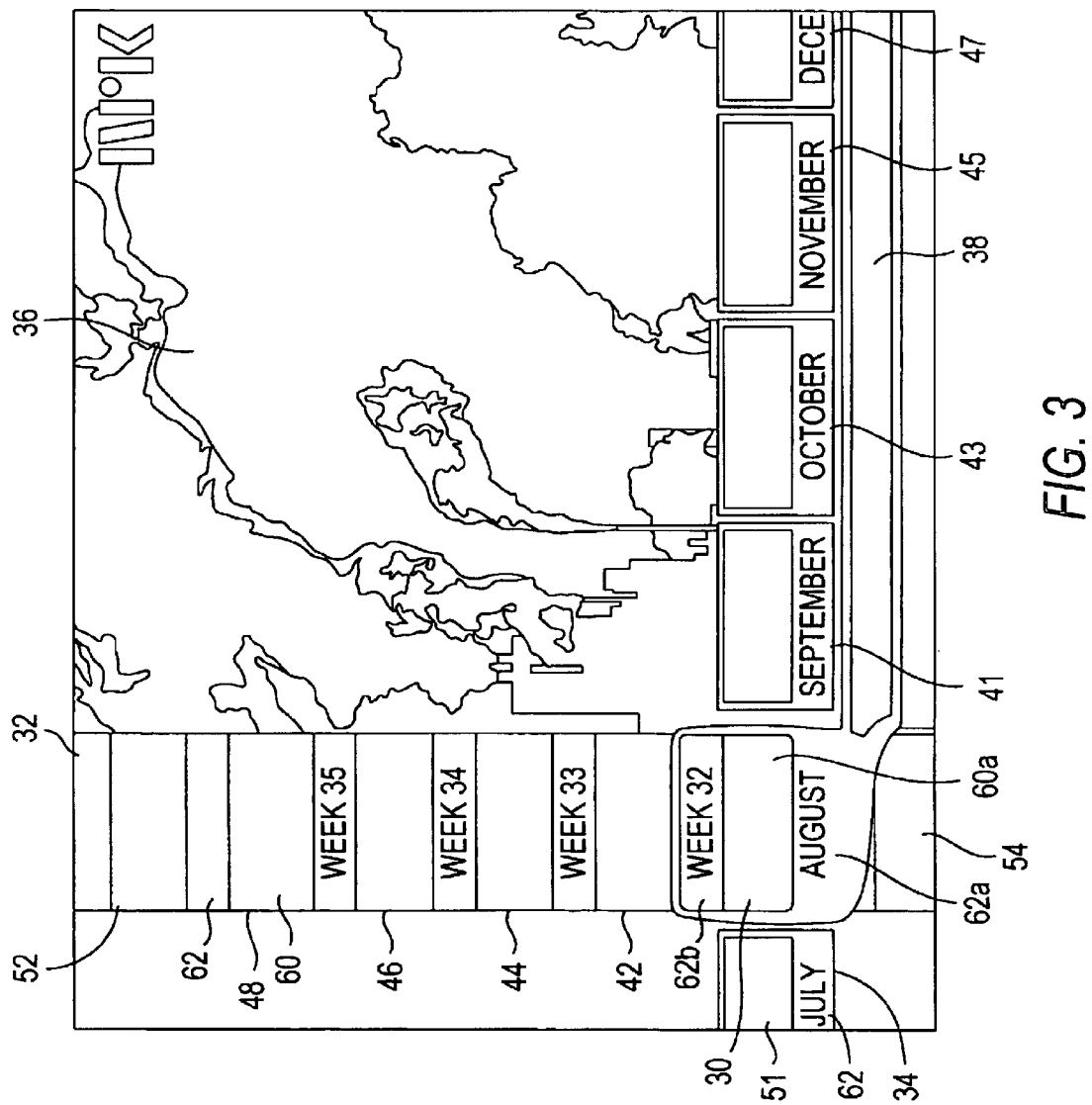
FIGS. 3, 4, 5, 6, 7, and 8 show one embodiment of the present invention at various different stages of operation.

Referring to FIG. 3, horizontal bar 34 is comprised of six panels 51, 30, 41, 43, 45 and 47. In the lower areas 62 of the horizontal panels is text describing the name of the folder, group or field represented by the respective panels. The horizontal panels depict folders of calendar months, here, July, August, September, October, November and December are shown. Although in this exemplary embodiment only the month names are shown, in addition the year of the months may also be shown. The vertical bar 32 is comprised of seven panels 54, 30, 42, 44, 46, 48 and 52. These vertical panels depict sub-groups collected in the calendar folder identified in area 62a of focus panel 30. In this exemplary embodiment, each of these panels in the vertical bar identifies a "Week" in the year occurring during the month of "August" which is identified in panel 62a of focus panel 30, i.e., "Week 32", "Week 33", "Week 34", and "Week 35". Although partially obscured, panel 54 would show "Week 31". Although panels 60 and 52 are shown as being blank because "Week 36" and "Week 37" do not take place in "August", alternatively, panels 60 and 52 may display "Week 36" and "Week 37", respectively, to enable the user to scroll within the calendar by weeks in addition to being able to scroll by months. Instead of displaying "Weeks" in the panels of vertical bar 32, alternatively, the individual days of the month, e.g., "August 17", "August 18", etc., may be shown. The bars 32, 34 are positioned proximate edges of the display so that a great proportion of the current programming 36 is visible. Information field 38 is blank in FIG. 3, but in practice could display relevant information associated with the folder or entry identified in area 62b of focus panel 30. As shown in FIG. 3, the positioning of the bars 32, 34 is preferably selected so as to minimize obstruction of a background picture 36 that is being shown on the display.

Figure 4:
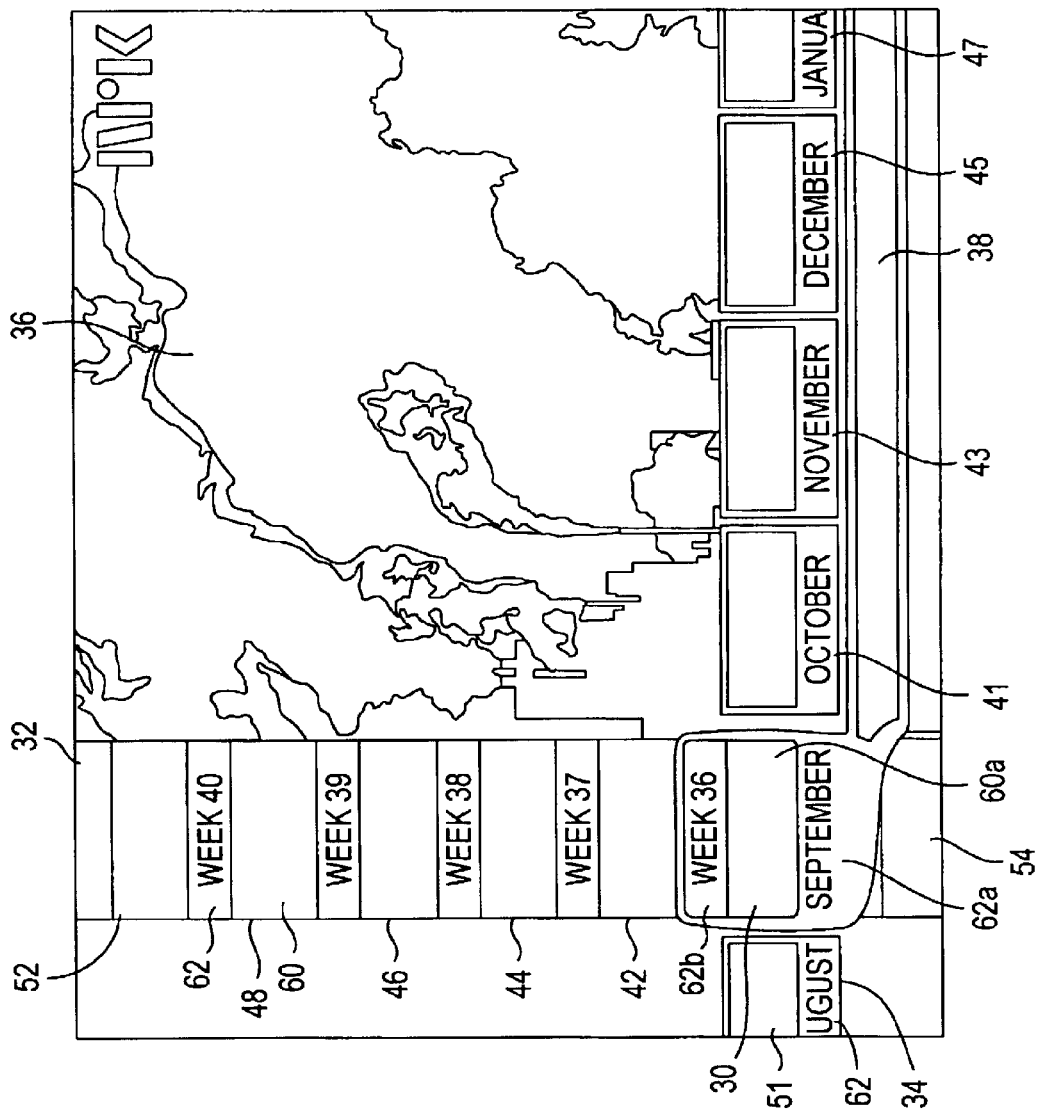
Figure 5:
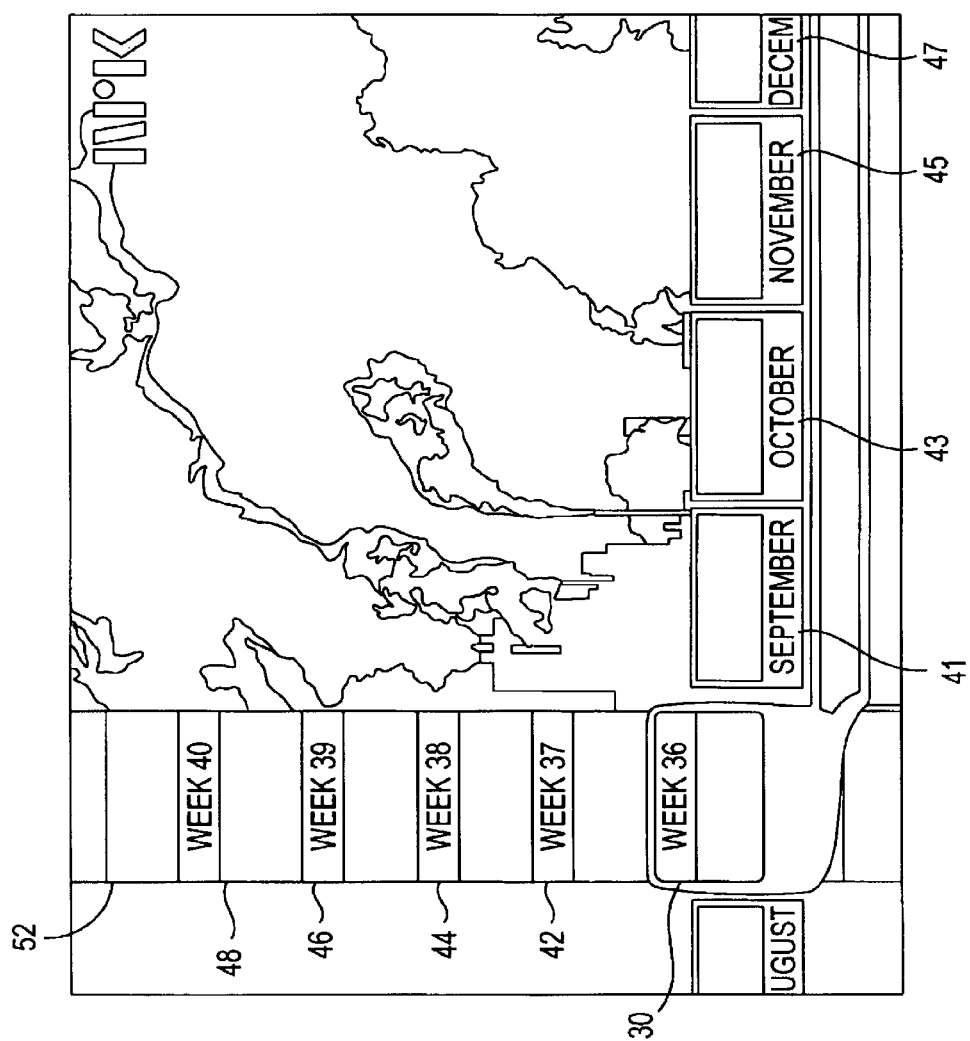

In this example, the user wants to view calendar entries in "September", the panel for which is to the right of focus panel 30. Consequently, the user uses the input device 24 to enter the "right" command once. The horizontal bar 34 shifts one position so that the focus panel 30 now shows "September" in area 62a, as shown in FIG. 4. The vertical bar now shows in its panels the sub-groups, collected in the folder entitled "September". The user then enters the "Select" key on the keyboard to select "September" as the month selected. As a result of this selection, "September" shifts to panel 41, as shown in FIG. 5.

Figure 6:
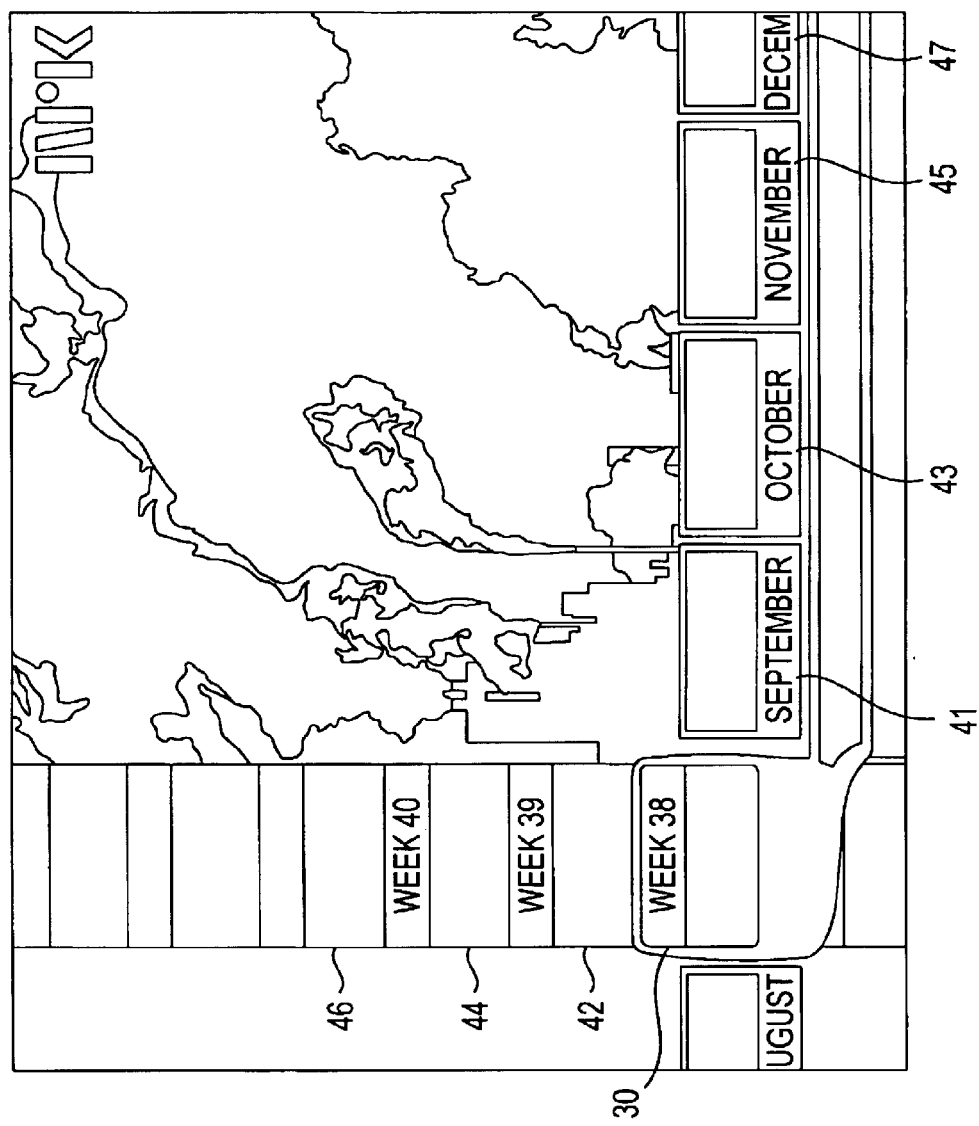
Figure 7:
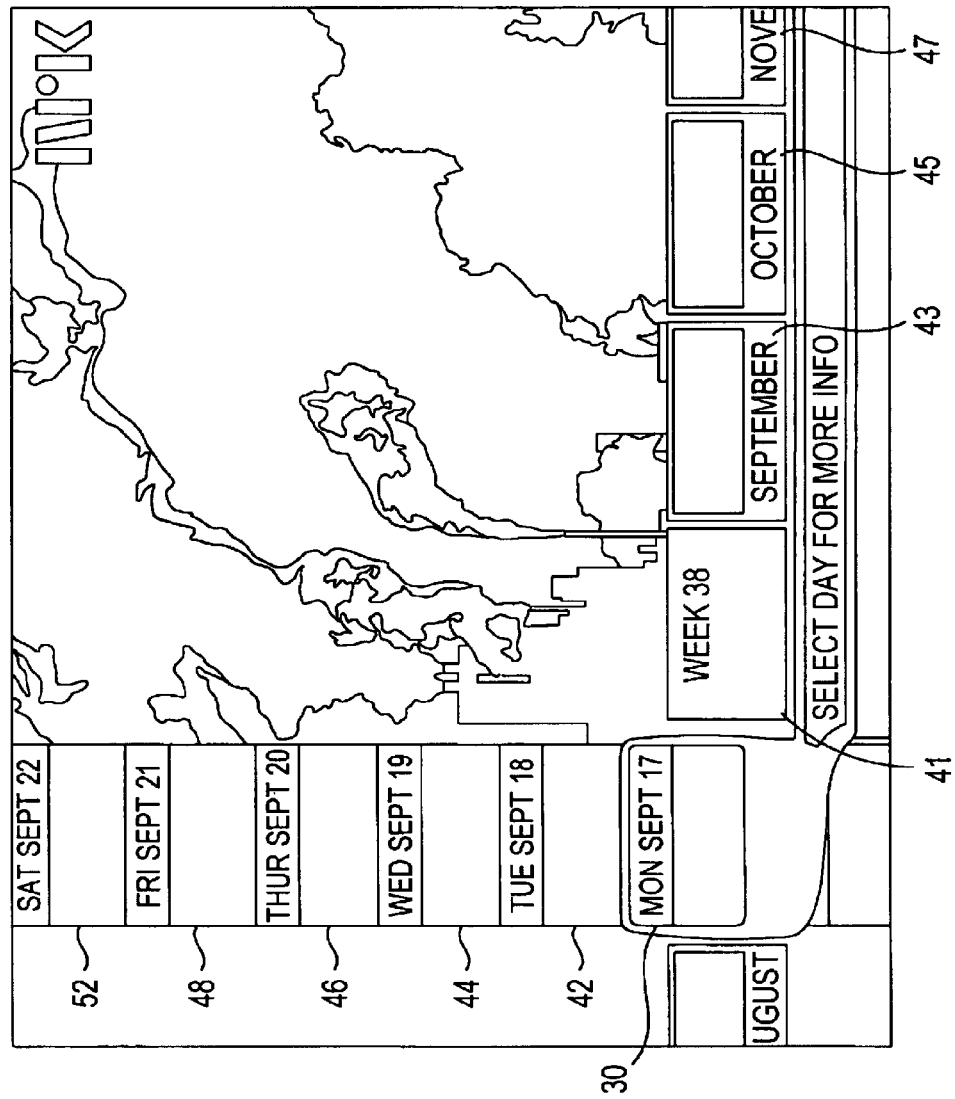

The user wants to view calendar entries for "Week 38", the panel for which is two positions up from the focus panel 30. Consequently, the user employs the input device 24 to enter the "up" command twice. The vertical bar shifts two positions so that the focus panel 30 now shows the sub-group "Week 38" in area 62b, as shown in FIG. 6. To display the calendar entries for "Week 38", the user enters the "Select" command on the input device 24. Upon selection, as shown in FIG. 7, the name for the calendar group selected, "Week 38", is then shifted to the right to panel 41, and "September" is shifted to the right to panel 43, "October" is shifted to the right to panel 45, and "November" is shifted to the right to panel 47. Additionally, all calendar day entries for "Week 38" are shown on the panels of vertical bar 32.

Figure 8:
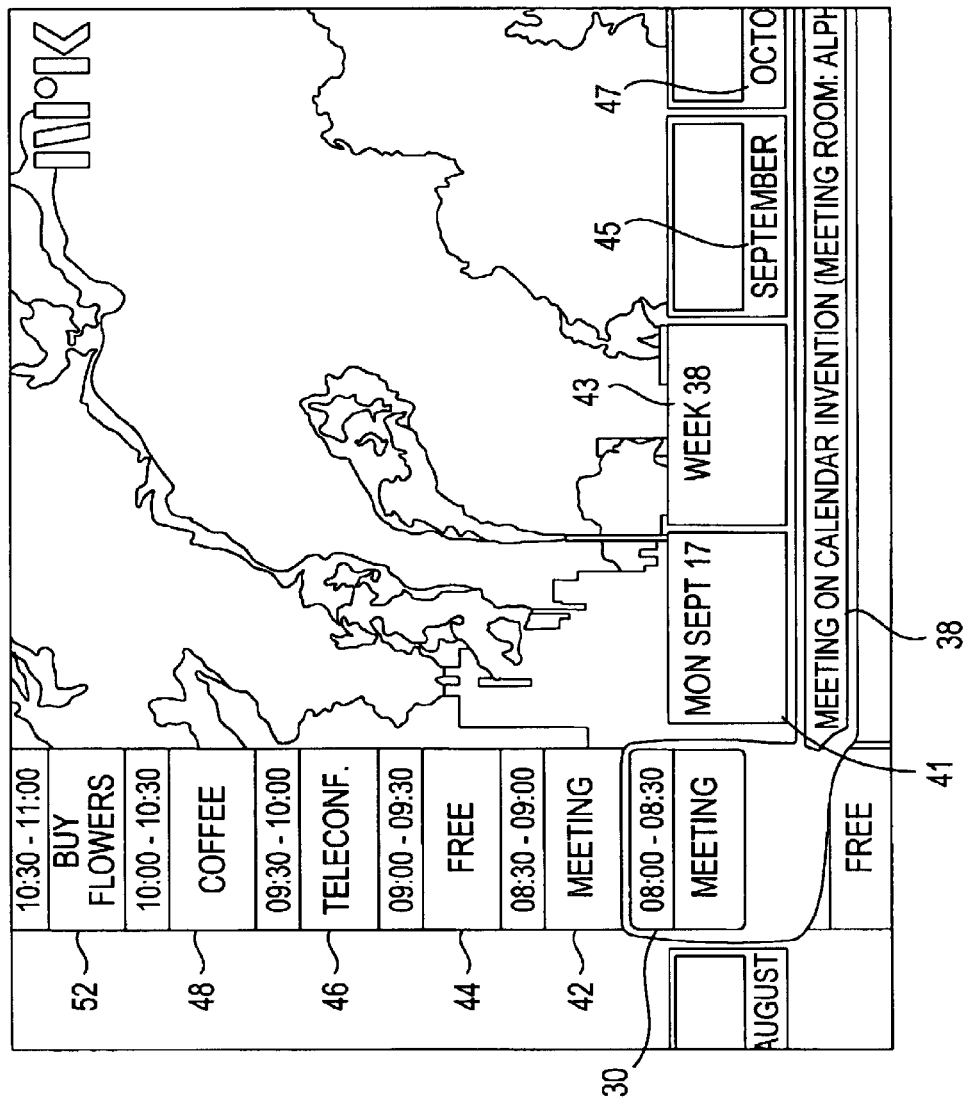

The user is interested in viewing entries for the calendar date "Mon, September 17" which is already in the focus panel 30. Upon entering the "Select" command, that date is selected, causing the display to be shown as in FIG. 8, in which "Mon, September 17" has been shifted to the right to panel 41, "Week 38" to the right to panel 43, "September" to the right to panel 45, and "October" to the right to panel 47. In addition, a number of the time entries for Monday, September 17 are now displayed in the vertical bar. In the area 62 of the panels 30, 42, 44, 46, 48, 52 of the vertical bar 32 are displayed various time blocks, which in this embodiment are half hour time blocks. Alternatively, the time blocks can be divided into time periods of shorter or longer duration. The precise duration of these time blocks may be preselected by the system or may be capable of being adjusted by the user. The central area 60 of the panels 30, 42, 44, 46, 48, 52 of the vertical bar 32 display a short summary of text entries for the respective time blocks. Alternatively, the entirety of the text entry may be shown in the central area 60 provided the entry is brief or the size of the text font is sufficiently small. Rather than displaying the entirety of the text entry for the time block, instead the entirety of the text entry for the time block appearing in the focus panel 30 may be displayed in information field 38, as shown in FIG. 8. Upon Selection of the time block panel within the focus panel 30, text for that time block may be added, edited or deleted by using the input device.

As shown in FIG. 8, even though the user has descended down a number of levels in the calendar folder hierarchy, the current location is immediately apparent: panel 45 shows folder "September", panel 43 shows "Week 38", panel 41 shows day "Mon September 17", and area 62b of focus panel 30 shows time block "08:00–08:30".

If the user wanted to move upward in the folder hierarchy, the appropriate commands (up, down, left, right, and select) are entered and the horizontal and vertical bars 32, 34 are then appropriately modified. Thus, if the user wanted to ascend to the level, shown in FIG. 3, from the point shown in FIG. 8, the user would merely enter the "left" command three times, as is evident from the fact that in FIG. 8 the panel "September" is shown as being three positions away from the focus panel 30.

Because the user's current location in the calendar is always apparent by a display of the folder path on the horizontal bar 34 irrespective of where in the folder hierarchy the user is currently located, navigation by the user up and down and across the folder hierarchy is apparent and simple to accomplish.

To further ease understanding of the hierarchical structure of the folders and sub-folders, etc., shown on the bars 32, 34, each level of folders preferably have a different color or coloring scheme. For example, the top level folders are green with black type, while at the next level down the sub-folders are blue with black type, and at the next level down the sub-sub-folders are red with white type, etc.

Although in the above-described embodiment the hierarchical structure of the user's current location is displayed in the panels on horizontal bar 34, alternatively this information may be displayed in the vertical bar 32 so that the information displayed in the bars 32, 34 are switched completely.

Figure 9:
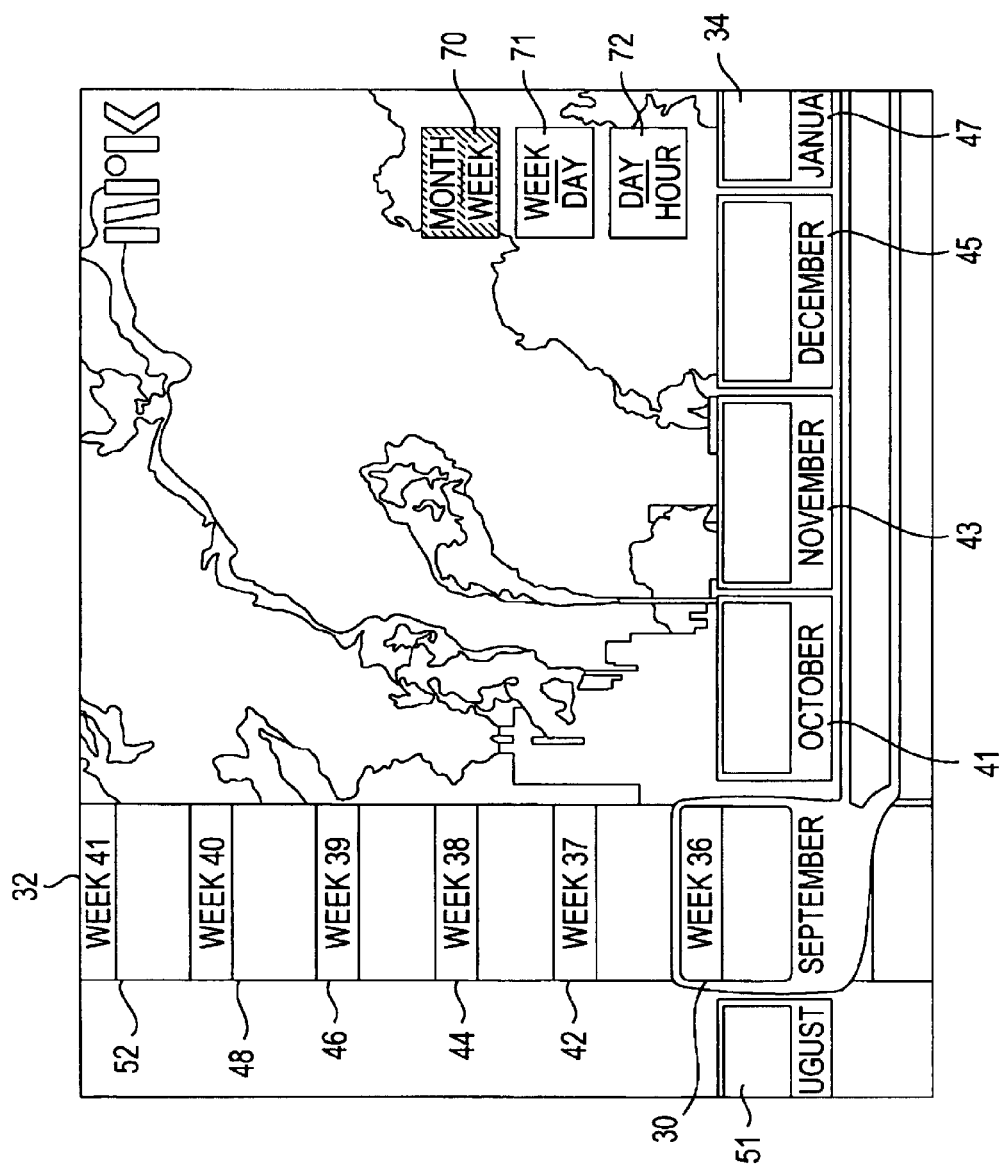
FIGS. 9, 10 and 11 show another embodiment of the present invention at various different stages of operation.
Figure 10:
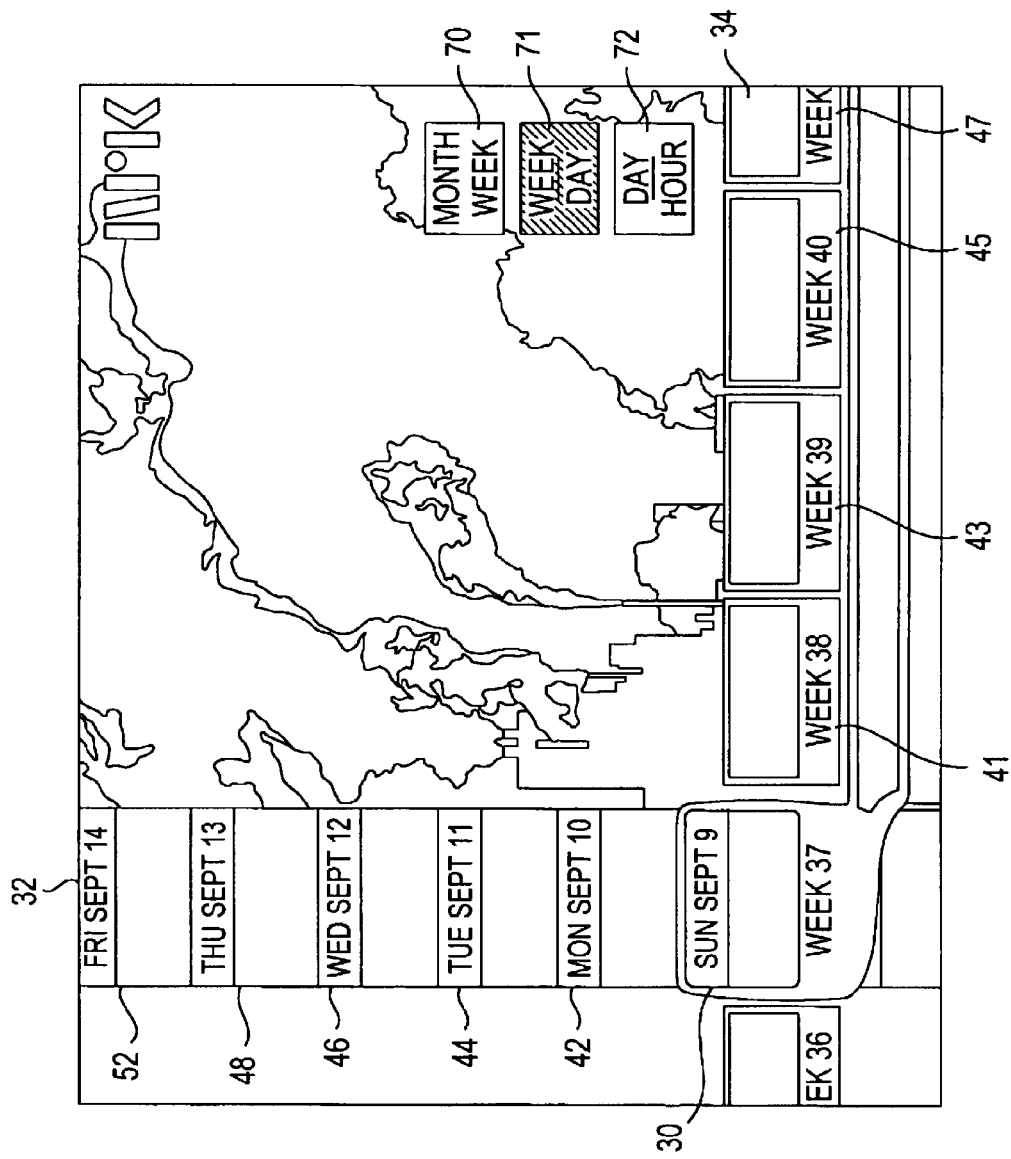
Figure 11:
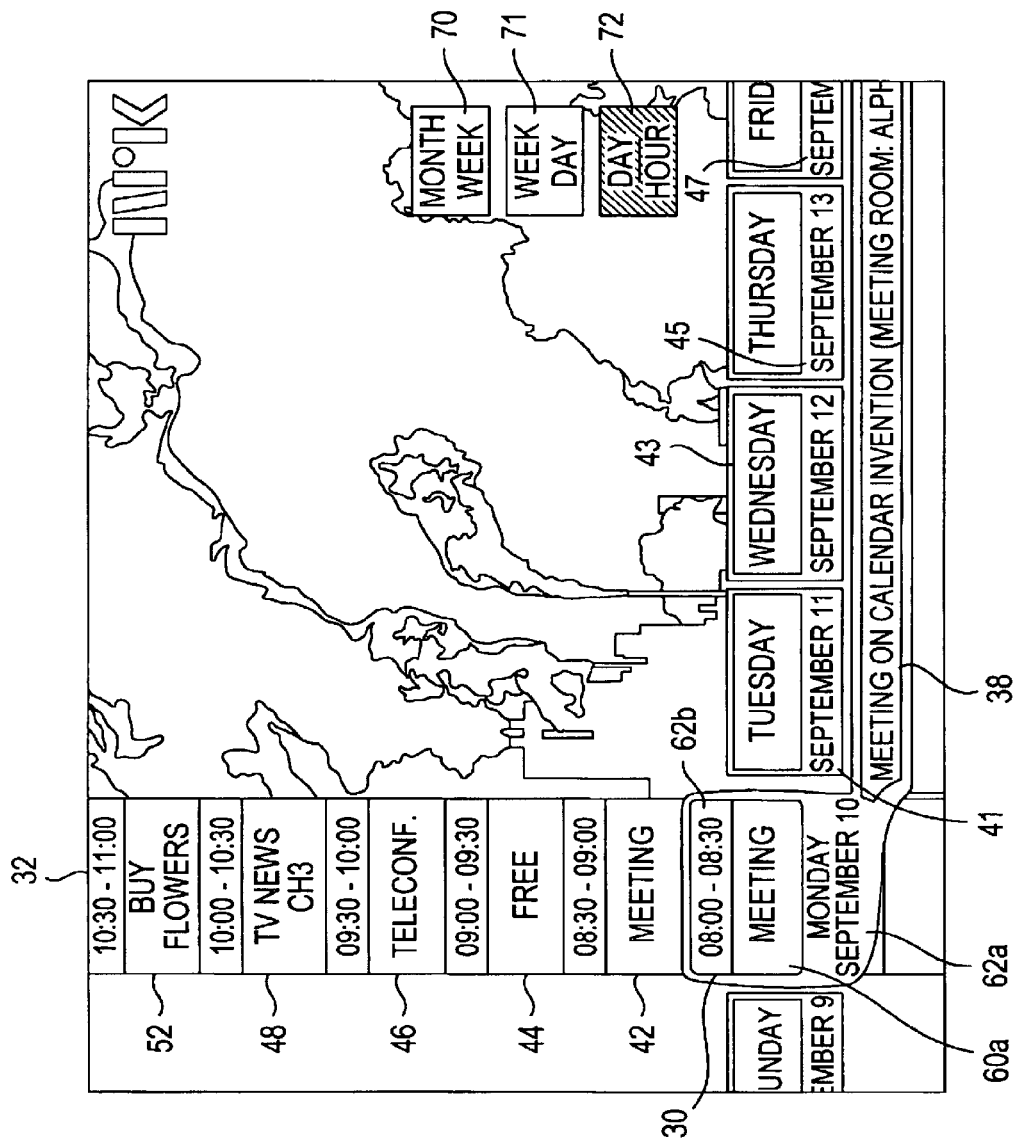

Another embodiment of the present invention is shown in FIG. 9. In this embodiment, the horizontal bar 34 always shows only the various calendar folders in the upper most displayed level, and the vertical bar 32 displays the various calendar folders in the next lower calendar level. Thus, in FIG. 9, panels 51, 30, 41, 43, 45, 47 display "August", "September", "October", "November", "December" and "January", respectively. The vertical bar 32 displays the various "Week" numbers for the "Month" appearing in the focus panel 30. The display also has a number of additional boxes 70, 71, 72 which display the names of the various levels that can be displayed in the calendar, with the number of such boxes depending upon the number of levels that are available. In FIG. 9, the boxes are labeled "Month/Week" 70, "Week/Day" 71, and "Day/Hour" 72. By using the input device, the user can move between the various available display alternatives. If the input device has a pointing device, such as a mouse or stylus, the user can select a desired display option box 70, 71, 72. Alternatively, the input device can have a plurality of dedicated buttons which correspond to the various display options. In FIG. 9, since "Months" and "Weeks" are displayed in bars 34, 32, the box labeled "Month/Week" 70 is highlighted in a contrasting color as compared to boxes 71, 72. In this example, the user wants to check the calendar entries for "Week 37" so he uses the input device to cause panel 42 to move into focus panel 30, and then enters a "select" command to select the entry for "Week 37" that is now in the focus panel 30; alternatively, the user may use the input device to select the box 71 labeled "Week/Day". As a result of this selection, the horizontal bar 34 displays the entries of the previously lower level, i.e., "Weeks", and the vertical bar 32 displays the entries for the folder in focus panel 30. Thus, as shown in FIG. 10, the panels of horizontal bar now display "Week 36", "Week 37", "Week 38", "Week 39", "Week 40" and "Week 41", and the panels of the vertical bar 32 now display day entries for the dates of "Sun September 9" to "Fri September 14", which are dates in "Week 37" which appears in the focus panel 30. Additionally, the box 71 indicating "Week/Day" is now highlighted in a contrasting color since "Weeks" are displayed in the horizontal bar 34 and "Days" are displayed in the vertical bar 32. The user then wants to check the calendar entries for "Monday, September 10". To do so, the user uses the input device to cause the panel "Mon September 10" to move into the focus panel 30 and then either "selects" this entry or selects the "Day/Hour" box 72. As a result of this selection, the display shown in FIG. 11 is displayed, in which the "Day/Hour" box 72 is highlighted. The user can then view, edit or delete any of the time block entries be appropriately moving the panels in the vertical bar 32 and selecting a time block panel of interest. If the user wants to view entries in a different folder level, such as, for example, in a different month, the "Month/Week" box 70 is selected using a pointer of the input device, reverting the display to one similar to that shown in FIG. 9. The boxes 70, 71, 72 allow the user to easily move between levels of the calendar database. Instead of using a pointer to select the appropriate box 70, 71, 72, alternatively the input device may have dedicated "Up Level" and "Down Level" buttons which, when activated, cause the displayed calendar to shift up or down a level in the calendar folder hierarchy.

In the embodiment shown in FIGS. 3 to 8 and in the embodiment shown in FIGS. 9 to 11, the system may be designed so that when the user scrolls the panels in the vertical bar 32 beyond entries associated with the selected horizontal bar 34 entry, the selected horizontal bar entry automatically changes. Thus, if the display is as shown in FIG. 9, if the user shifts the panels in the vertical bar a sufficient number of times so that "Week 2" appears in the focus panel 30, the month "January" would automatically appear in area 62a of the focus panel 30, and "December", "February", "March", "April", and "May" will be shown in panels 51, 41, 43, 45, and 47, respectively. Preferably, the "Month" indications in the horizontal bar 34 automatically change as the panels in the vertical bar 32 are scrolled.

Figure 12:
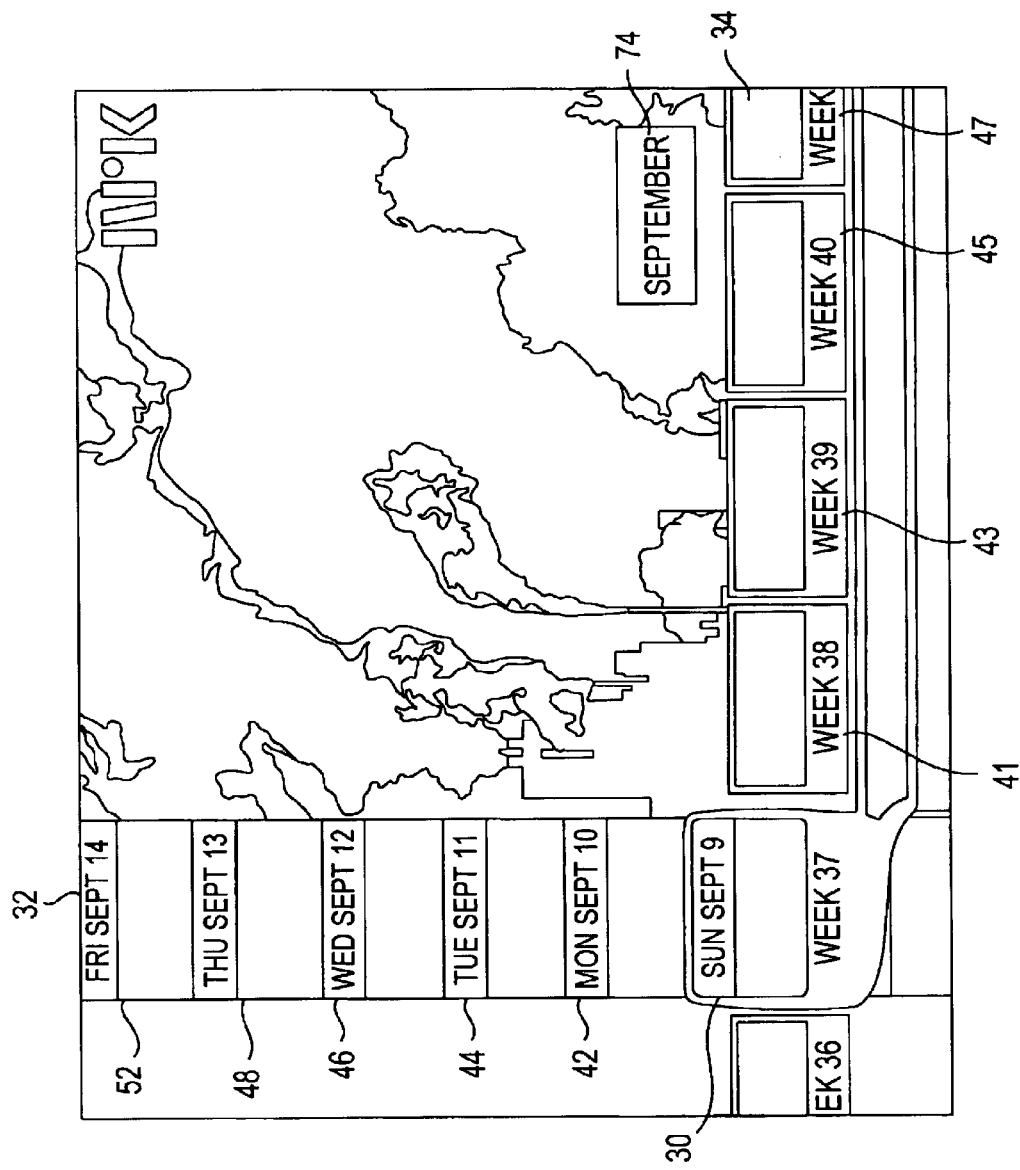
FIGS. 12 and 13 show another embodiment of the present invention at various different stages of operation.
Figure 13:
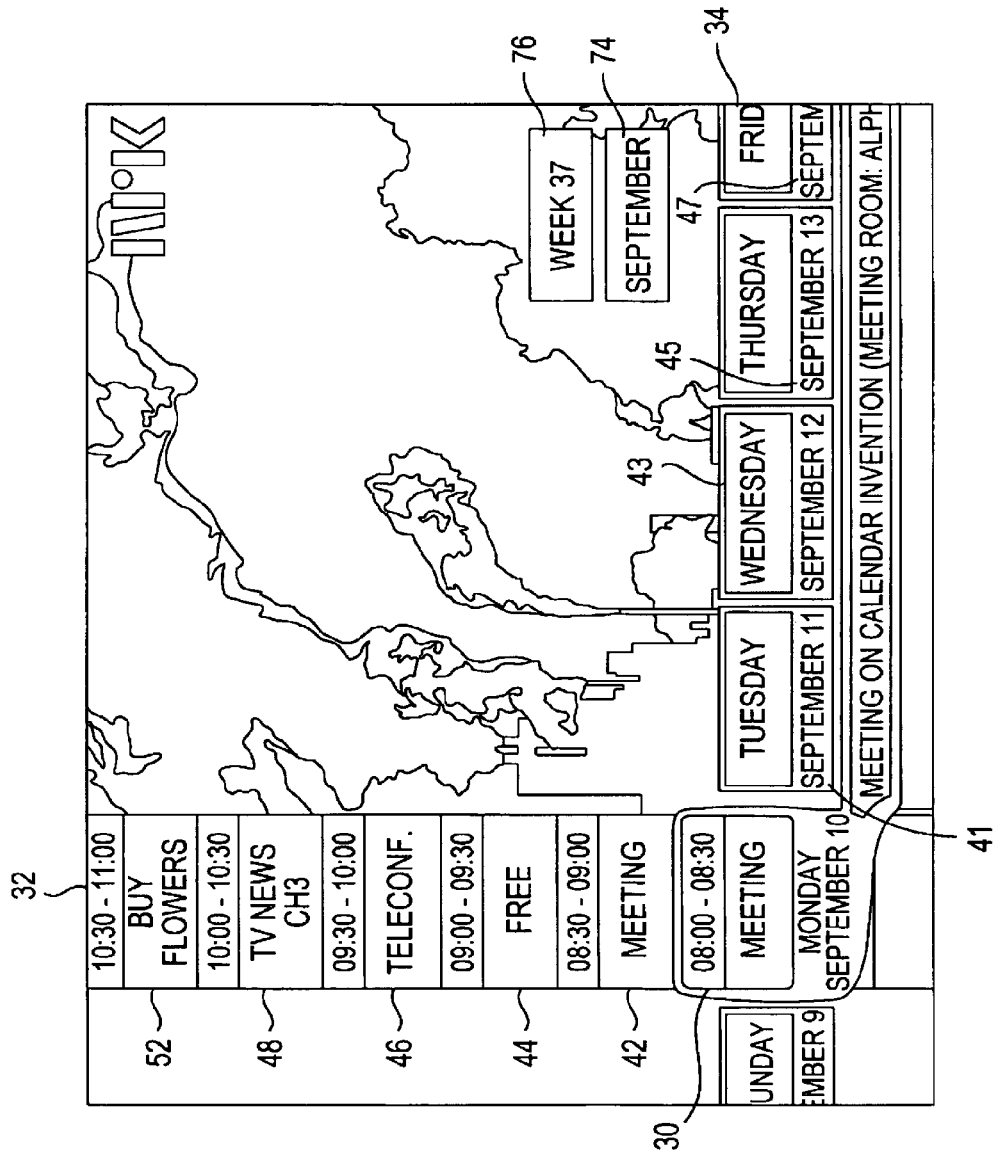

Another embodiment of the present invention is shown in FIGS. 12 and 13. The initial frame of this embodiment, showing the highest two levels in the hierarchical calendar folder structure, is identical to FIG. 4 in which the "Months" are shown in the vertical bar 34 and the "Weeks" are shown in the vertical bar 32. Once "September" is selected, the display reverts to that shown in FIG. 12 in which the "Weeks" are shown in the horizontal bar 34 and the "Days" are shown in the vertical bar 32. In addition, a box 74 indicates that "September" had previously been selected from the highest folder level. When "Mon September 10" is selected, the display reverts to that shown in FIG. 13 in which the "Days" are shown in the horizontal bar 34 and "Hour Blocks" are shown in the vertical bar 32. In this embodiment, the currently selected location of the user in the calendar folder database is always displayed. As discussed above, if desired, the system may be set up so that if a user scrolls sufficiently within a folder to change the month or week, the month or week displayed in boxes 74, 76 automatically change to reflect the "Week" and "Month" of the day in the focus panel 30.

Although the bars 32, 34 are shown as linear, they may be virtual loops so that when the user scrolls through the bar to one end, the next panel that is presented is the panel at the other end. Thus, if the loop comprises only the folders shown, after scrolling the horizontal bar 34 so that folders pass through the focus panel 30 one after the other until the folder originally in panel 49 moves to focus panel 30, the folder in panel 41 will become the folder that was originally in panel 51. A virtual loop may also have more entries than are displayed at once. Thus, for example, although only six folders are displayed, the virtual loop may actually contain many more than six folders, with others of the remaining folders being displayed as the user scrolls along the bar, thereby causing some of the initial six folders to disappear.

Movement of the panels of the bars 32, 34 may be accomplished by entering other commands than those discussed above, such as, for example, with reference to the discussion above concerning FIGS. 3 to 9 substituting "left" for "right", "up" for "down", etc. Although it is preferred for the input device 24 to have four movement command keys so that all four possible movement commands can be easily entered, alternatively only two movement command buttons may be needed if the bars 32, 34 are virtual loops as discussed. Thus, by pressing a horizontal movement command button repeatedly, the appropriate panel will eventually scroll to the focus panel 30.

To allow more of the background picture to be displayed to the user, one or more of the panels in one or both of the bars 32, 34 distant from the focus panel 30 may be transparent or semi-transparent. In addition, the focus panel 30 itself may also be semi-transparent. Although the bars 32, 34 are shown in the figures as being adjacent the left and bottom edges of the user interface, they may be positioned adjacent other edges of the user interface.

The focus panel 30 may be displayed in a higher intensity, be shadowed and/or be larger than the other panels to enhance the viewability of the focus panel 30.

Thus, while there have been shown and described and pointed out fundamental novel features of the present invention as applied to preferred embodiments thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A method for displaying calendar information in a display associated with an electronic device, comprising:

organizing a plurality of calendar entries into a hierarchy comprising a plurality of calendar groups, at least one of which calendar groups having at least one sublevel of calendar subgroups; and displaying panels on a display associated with an electronic device, the panels being arranged into two bars of panels with a common focus panel at the intersection of the two bars of panels, each of the panels being linked to and identifying one of (a) one of the plurality of calendar entries, (b) one of the calendar groups, and (c) one of the calendar subgroups, wherein the focus panel identifies (a) a currently selectable lowest level in the hierarchy and optionally (b) the next higher level, if any, wherein levels, if any, in the hierarchy higher than that displayed in the focus panel are identified in one of (a) succeeding adjoining panels of a first of the two bars, other panels of the first bar identifying highest level groups in the hierarchy, and (b) other panels of the first bar identifying groups in the hierarchy in the next higher level identified in the focus panel; and wherein panels of the second of the two bars each identify one of (a) calendar entries, if any, (b) calendar groups, if any, and (c) calendar subgroups, if any, of the same level in the hierarchy as the currently selectable lowest level in the hierarchy identified in the focus panel.

2. The method of claim 1, wherein the two bars are sized and positioned on the display so as to permit viewing of a substantial portion of a background image presented on the display.

3. The method of claim 1, wherein the two bars are perpendicular to one another.

4. The method of claim 3, wherein each of the two bars are positioned on the display to be proximate an edge of the display.

5. The method of claim 3, wherein each of the two bars are positioned on the display to be parallel to an edge of the display.

6. The method of claim 1, wherein the two bars are displayed on the display only upon entry of a command by a user.

7. The method of claim 1, wherein the calendar groups comprise months of the year.

8. The method of claim 7, wherein the calendar groups comprise weeks of the year.

9. The method of claim 7, wherein the calendar groups comprise days of the year.

10. The method of claim 8, wherein the calendar groups comprise days of the year.

11. The method of claim 9, wherein the calendar entries correspond to discrete time periods within a day.

12. The method of claim 10, wherein the calendar entries correspond to discrete time periods within a day.

13. The method of claim 11, wherein each calendar entry is capable of storing information associated with the associated discrete time period.

14. The method of claim 12, wherein each calendar entry is capable of storing information associated with the associated discrete time period.

15. The method of claim 1, wherein a currently selected lowest level in the hierarchy identified in the focus panel is changed upon the entry of a navigation command by the user on an input device.

16. The method of claim 1, wherein calendar entries, groups, or subgroups linked to the panels are identified on the panels by text.

17. The method of claim 1, wherein at least one of the panels is one of semi-transparent and transparent.

18. The method of claim 1, wherein scrolling through panels in a bar will cause panels of the other bar to change as appropriate.

19. A method for displaying calendar information in a display associated with an electronic device, comprising:

organizing a plurality of calendar entries into a hierarchy comprising a plurality of calendar groups, at least one of which calendar groups having at least one sublevel of calendar subgroups;

displaying panels on a display associated with an electronic device, the panels being arranged into two bars of panels with a common focus panel at the intersection of the two bars of panels, each of the panels being linked to and identifying one of (a) one of the plurality of calendar entries, (b) one of the calendar groups, and (c) one of the calendar subgroups; and providing a means for navigating between different levels of groups, wherein the focus panel identifies (a) a currently selectable lowest level in the hierarchy and optionally (b) the next higher level, if any, wherein panels of the first bar identify groups in the hierarchy in the next higher level identified in the focus panel, wherein panels of the second of the two bars each identify one of (a) calendar entries, if any, (b) calendar groups, if any, and (c) calendar subgroups, if any, of the same level in the hierarchy as the currently selectable lowest level in the hierarchy identified in the focus panel.

20. The method of claim 19, wherein navigating between different levels of groups is accomplished by selecting with an input device a desired group level.

21. The method of claim 20, wherein selecting a desired group level with the input device comprises activating a button on the input device.

22. The method of claim 20, wherein selecting a desired group level with the input device comprises selecting a box on the display.

23. The method of claim 19, wherein navigating between different levels of groups is accomplished by causing the panels of one of the two bars to move and selecting with an input device the group in the focus panel.

24. The method of claim 19, wherein the two bars are sized and positioned on the display so as to permit viewing of a substantial portion of a background image presented on the display.

25. The method of claim 19, wherein the two bars are perpendicular to one another.

26. The method of claim 25, wherein each of the two bars are positioned on the display to be proximate an edge of the display.

27. The method of claim 25, wherein each of the two bars are positioned on the display to be parallel to an edge of the display.

28. The method of claim 19, wherein the two bars are displayed on the display only upon entry of a command by a user.

29. The method of claim 19, wherein the calendar groups comprise months of the year.

30. The method of claim 29, wherein the calendar groups comprise weeks of the year.

31. The method of claim 29, wherein the calendar groups comprise days of the year.

32. The method of claim 30, wherein the calendar groups comprise days of the year.

33. The method of claim 31, wherein the calendar entries correspond to discrete time periods within a day.

34. The method of claim 32, wherein the calendar entries correspond to discrete time periods within a day.

35. The method of claim 33, wherein each calendar entry is capable of storing information associated with the associated discrete time period.

36. The method of claim 34, wherein each calendar entry is capable of storing information associated with the associated discrete time period.

37. The method of claim 19, wherein calendar entries, groups, or subgroups linked to the panels are identified on the panels by text.

38. The method of claim 19, wherein at least one of the panels is one of semi-transparent and transparent.

39. The method of claim 19, wherein scrolling through panels in a bar will cause panels of the other bar to change as appropriate.

40. An apparatus for displaying calendar information in a display associated with an electronic device, comprising:

a database storing a plurality of calendar entries in a hierarchy comprising a plurality of groups, at least one of which groups having at least one sublevel of subgroups; and a means for displaying panels on a display associated with an electronic device, the panels being arranged into two bars of panels with a common focus panel at the intersection of the two bars of panels, each of the panels being linked to and identifying one of (a) one of the plurality of calendar entries, (b) one of the calendar groups, and (c) one of the calendar subgroups, wherein the focus panel identifies (a) a currently selectable lowest level in the hierarchy and optionally (b) the next higher level, if any, wherein levels, if any, in the hierarchy higher than that displayed in the focus panel are identified in one of (a) succeeding adjoining panels of a first of the two bars, other panels of the first bar identifying highest level groups in the hierarchy, and (b) other panels of the first bar identifying groups in the hierarchy in the next higher level identified in the focus panel; and wherein panels of the second of the two bars each identify one of (a) calendar entries, if any, (b) calendar groups, if any, and (c) calendar subgroups, if any, of the same level in the hierarchy as the currently selectable lowest level in the hierarchy identified in the focus panel.

41. The apparatus of claim 40, wherein the two bars are sized and positioned on the display so as to permit viewing of a substantial portion of a background image presented on the display.

42. The apparatus of claim 40, wherein the two bars are perpendicular to one another.

43. The apparatus of claim 42, wherein each of the two bars are positioned on the display to be proximate an edge of the display.

44. The apparatus of claim 42, wherein each of the two bars are positioned on the display to be parallel to an edge of the display.

45. The apparatus of claim 40, wherein the two bars are displayed on the display only upon entry of a command by a user.

46. The apparatus of claim 40, wherein the calendar groups comprise months of the year.

47. The apparatus of claim 46, wherein the calendar groups comprise weeks of the year.

48. The apparatus of claim 46, wherein the calendar groups comprise days of the year.

49. The apparatus of claim 47, wherein the calendar groups comprise days of the year.

50. The apparatus of claim 48, wherein the calendar entries correspond to discrete time periods within a day.

51. The apparatus of claim 49, wherein the calendar entries correspond to discrete time periods within a day.

52. The apparatus of claim 50, wherein each calendar entry is capable of storing information associated with the associated discrete time period.

53. The apparatus of claim 51, wherein each calendar entry is capable of storing information associated with the associated discrete time period.

54. The apparatus of claim 40, wherein a currently selected lowest level in the hierarchy identified in the focus panel is changed upon the entry of a navigation command by the user on an input device.

55. The apparatus of claim 40, wherein calendar entries, groups, or subgroups linked to the panels are identified on the panels by text.

56. The apparatus of claim 40, wherein at least one of the panels is one of semi-transparent and transparent.

57. The apparatus of claim 40, wherein scrolling through panels in a bar will cause panels of the other bar to change as appropriate.

58. An apparatus for displaying calendar information in a display associated with an electronic device, comprising:
   a database storing a plurality of calendar entries in a hierarchy comprising a plurality of groups, at least one of which groups having at least one sublevel of subgroups; and
   a means for displaying panels on a display associated with an electronic device, the panels being arranged into two bars of panels with a common focus panel at the intersection of the two bars of panels, each of the panels being linked to and identifying one of (a) one of the plurality of calendar entries, (b) one of the calendar groups, and (c) one of the calendar subgroups; and
   a means for navigating between different levels of groups,
   wherein the focus panel identifies (a) a currently selectable lowest level in the hierarchy and optionally (b) the next higher level, if any,
   wherein panels of the first bar identify groups in the hierarchy in the next higher level identified in the focus panel, wherein panels of the second of the two bars each identify one of (a) calendar entries, if any, (b) calendar groups, if any, and (c) calendar subgroups, if any, of the same level in the hierarchy as the currently selectable lowest level in the hierarchy identified in the focus panel.

59. The apparatus of claim 58, wherein navigating between different levels of groups is accomplished by selecting with an input device a desired group level.

60. The apparatus of claim 59, wherein selecting a desired group level with the input device comprises activating a button on the input device.

61. The apparatus of claim 59, wherein selecting a desired group level with the input device comprises selecting a box on the display.

62. The apparatus of claim 58, wherein navigating between different levels of groups is accomplished by causing the panels of one of the two bars to move and selecting with an input device the group in the focus panel.

63. The apparatus of claim 58, wherein the two bars are sized and positioned on the display so as to permit viewing of a substantial portion of a background image presented on the display.

64. The apparatus of claim 58, wherein the two bars are perpendicular to one another.

65. The apparatus of claim 64, wherein each of the two bars are positioned on the display to be proximate an edge of the display.

66. The apparatus of claim 64, wherein each of the two bars are positioned on the display to be parallel to an edge of the display.

67. The apparatus of claim 58, wherein the two bars are displayed on the display only upon entry of a command by a user.

68. The apparatus of claim 58, wherein the calendar groups comprise months of the year.

69. The apparatus of claim 68, wherein the calendar groups comprise weeks of the year.

70. The apparatus of claim 68, wherein the calendar groups comprise days of the year.

71. The apparatus of claim 69, wherein the calendar groups comprise days of the year.

72. The apparatus of claim 70, wherein the calendar entries correspond to discrete time periods within a day.

73. The apparatus of claim 71, wherein the calendar entries correspond to discrete time periods within a day.

74. The apparatus of claim 72, wherein each calendar entry is capable of storing information associated with the associated discrete time period.

75. The apparatus of claim 73, wherein each calendar entry is capable of storing information associated with the associated discrete time period.

76. The apparatus of claim 58, wherein calendar entries, groups, or subgroups linked to the panels are identified on the panels by text.

77. The apparatus of claim 58, wherein at least one of the panels is one of semi-transparent and transparent.

78. The apparatus of claim 58, wherein scrolling through panels in a bar will cause panels of the other bar to change as appropriate.

* * * * *